US012625334B2

(12) United States Patent  (10) Patent No.:  US 12,625,334 B2
Huang                          (45) Date of Patent:       May 12, 2026

(54) 400G SILICON PHOTONIC INTEGRATED OPTICAL MODULE WITH EMBEDDED THERMOELECTRIC COOLER (TEC) SUBSTRATE

(71) Applicant: SHUNYUN TECHNOLOGY (ZHONGSHAN) Limited, Zhongshan (CN)

(72) Inventor: Jie Huang, Zhongshan (CN)

(73) Assignee: SHUNYUN TECHNOLOGY (ZHONGSHAN) Limited, Zhongshan (CN)

( * ) Notice: Subject to any disclaimer, the term of this patent is extended or adjusted under 35 U.S.C. 154(b) by 345 days.

(21) Appl. No.: 18/437,258

(22) Filed: Feb. 9, 2024

(65) Prior Publication Data

US 2024/0280771 A1     Aug. 22, 2024

(30) Foreign Application Priority Data

Feb. 21, 2023    (CN) .......................... 202310149589.0

(51) Int. Cl.
*G02B 6/42*          (2006.01)

(52) U.S. Cl.
CPC ........... *G02B 6/4271* (2013.01); *G02B 6/428* (2013.01)

(58) Field of Classification Search
CPC .... G02B 6/4271; G02B 6/424; G02B 6/4245; G02B 6/428; G02B 6/4286; G02B 6/4214; G02B 6/4246
USPC ............... 385/14, 15, 36; 398/138, 139, 141
See application file for complete search history.

(56) References Cited

U.S. PATENT DOCUMENTS

| | | | | |
|---|---|---|---|---|
| 10,054,737 | B2 * | 8/2018 | Kobrinsky | ......... G02B 6/12004 |
| 11,262,498 | B2 * | 3/2022 | Byrd | .................. G02B 6/12004 |
| 11,564,312 | B2 * | 1/2023 | Verslegers | ........... H05K 1/0274 |
| 12,481,107 | B2 * | 11/2025 | Wu | ....................... G02B 6/4204 |
| 2020/0310142 | A1 * | 10/2020 | O'Brien | ............. G02B 19/0052 |
| 2024/0134136 | A1 * | 4/2024 | Huang | ................. G02B 6/4271 |

FOREIGN PATENT DOCUMENTS

| | | |
|---|---|---|
| CN | 211236354 U | 8/2020 |
| CN | 113037387 A | 6/2021 |
| CN | 218158413 U | 12/2022 |

* cited by examiner

*Primary Examiner* — Robert Tavlykaev

(57)          ABSTRACT

A 400G silicon photonic integrated optical module with an embedded thermoelectric cooler (TEC) substrate includes: a housing, a printed circuit board (PCB) substrate, and a silicon photonic integrated circuit board, where an accommodating cavity is formed in the housing; the PCB substrate is provided in the accommodating cavity; a TEC substrate is embedded into the PCB substrate; the silicon photonic integrated circuit board is provided on the TEC substrate; the silicon photonic integrated circuit board is provided with an extended segment; the extended segment extends to one side and to the PCB substrate; a fiber array, an electronic integrated circuit board, a light emission assembly, and a light-receiving detector are arranged on the silicon photonic integrated circuit board; the light emission assembly is mounted on the silicon photonic integrated circuit board; and the light emission assembly and the light-receiving detector are provided above the TEC substrate.

8 Claims, 7 Drawing Sheets

16

400G SILICON PHOTONIC INTEGRATED OPTICAL MODULE WITH EMBEDDED THERMOELECTRIC COOLER (TEC) SUBSTRATE

CROSS REFERENCE TO RELATED APPLICATIONS

The present application claims the benefit of Chinese Patent Application No. 2023101495890 filed on Feb. 21, 2023, the contents of which are incorporated herein by reference in their entirety.

TECHNICAL FIELD

The present disclosure relates to the technical field of fiber communications, and in particular to a 400G silicon photonic integrated optical module with an embedded thermoelectric cooler (TEC) substrate.

BACKGROUND

With rapid development of optical communication industry and constant upgrade of communication technologies, an optical module as a central component in optical communication is developed toward a high rate and a high density to meet development demands in the communication. An optical chip serves as a core component of the optical module. To ensure continuous and stable operation of the optical module, the optical chip is required to work within a certain temperature range. Therefore, heat dissipation of the optical chip is crucial.

The Chinese Utility Patent with Publication No. CN 211236354 U provides a 400G optical module. The optical module includes a main heat dissipation shell, an auxiliary heat dissipation shell, and a printed circuit board (PCB). A control chip is provided on the PCB. The PCB is connected to a laser. A front side of the laser is sequentially provided with an optical assembly and a fiber array. The fiber array is connected to a fiber. The optical module further includes a TEC. The laser and a lower end of the fiber array are attached to the TEC. The TEC is provided in a metal heat sink. The metal heat sink includes an extension portion extending to a rear side of the fiber array. A fiber groove is formed in the extension portion corresponding to each fiber. A lower end of the metal heat sink, the fiber groove, and an upper end of the fiber groove each are provided with a heat conductive pad. The head conductive pad is attached to the main heat dissipation shell and the auxiliary heat dissipation shell. Heat from the laser and the fiber array is dissipated through the TEC and the metal heat sink to meet a heat dissipation requirement. However, the laser is connected to the PCB through a bonding alloy wire, and is then attached to the TEC. This causes a complex manufacturing process.

SUMMARY

An objective of the present disclosure is to provide a 400G silicon photonic integrated optical module with an embedded TEC substrate, to solve a problem of a complex manufacturing process due to a fact that the laser is connected to the PCB through a bonding alloy wire, and is then attached to the TEC in prior art.

To Achieve the Above Objective, the Present Disclosure Employs the Following Technical Solutions A 400G silicon photonic integrated optical module with an embedded TEC substrate provided by the present disclosure includes:

a housing, where an accommodating cavity is formed in the housing;

a PCB substrate, where the PCB substrate is provided in the accommodating cavity, and a TEC substrate is embedded into the PCB substrate; and a silicon photonic integrated circuit board, where the silicon photonic integrated circuit board is provided on the TEC substrate, the silicon photonic integrated circuit board is provided with an extended segment, and the extended segment extends along a side of the PCB substrate in a length direction of the PCB substrate to the PCB substrate, where a fiber array, an electronic integrated circuit board, a light emission assembly, and a light-receiving detector are arranged on the silicon photonic integrated circuit board; the light emission assembly is mounted on the silicon photonic integrated circuit board in an upside-down manner; and the light emission assembly and the light-receiving detector are provided above the TEC substrate.

Preferably, the silicon photonic integrated circuit board is mounted on the PCB substrate and the TEC substrate through a flip chip.

Preferably, the electronic integrated circuit board is mounted on the extended segment of the silicon photonic integrated circuit board through a flip chip.

Preferably, a groove is formed in the PCB substrate; the TEC substrate is embedded into the groove; and an upper surface of the TEC substrate is flush with an upper surface of the PCB substrate.

Preferably, the light emission assembly includes a laser and triangular prisms; two sides of the laser each are provided with one of the triangular prisms; the laser is mounted on the silicon photonic integrated circuit board in an upside-down manner; and mirror surfaces of two of the triangular prisms are symmetric with respect to the laser.

Preferably, there are two light emission assemblies; the two light emission assemblies are spaced; and the two light emission assemblies are provided at a same side of the electronic integrated circuit board.

Preferably, a monitor photo detector (MPD) is further integrated onto the silicon photonic integrated circuit board; and the MPD is connected to the light emission assembly.

Preferably, one end of the PCB substrate is provided with a multi-fiber push on (MPO) optical connector; the MPO optical connector is connected to the fiber array through a fiber; and the other end of the PCB substrate is provided with a gold finger electrical connector.

The 400G silicon photonic integrated optical module with an embedded TEC substrate provided by the embodiment of the present disclosure has the following beneficial effects over the prior art:

According to the 400G silicon photonic integrated optical module with an embedded TEC substrate provided by the embodiment of the present disclosure, the TEC substrate is embedded into the PCB substrate. The silicon photonic integrated circuit board is provided on the TEC substrate. Components such as the fiber array, the electronic integrated circuit board, the light emission assembly and the light-receiving detector are arranged on the silicon photonic integrated circuit board. Heat from the light emission assembly can be dissipated through the TEC substrate to ensure normal operation of the optical module. Moreover, the light emission assembly is fixed on the silicon photonic integrated circuit board through a flip chip. This omits a welding process of a metal wire and simplifies a manufacturing process.

Figure 1:
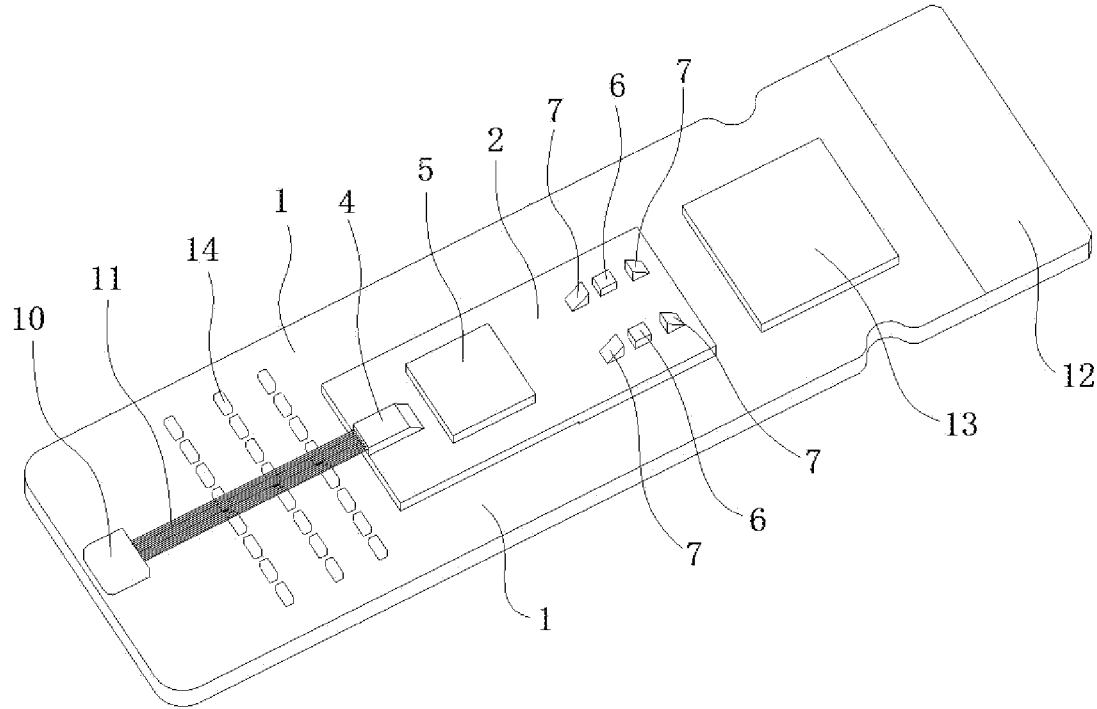
FIG. 1 is a schematic structural view of a 400G silicon photonic integrated optical module with an embedded TEC substrate according to an embodiment of the present disclosure.
Figure 2:
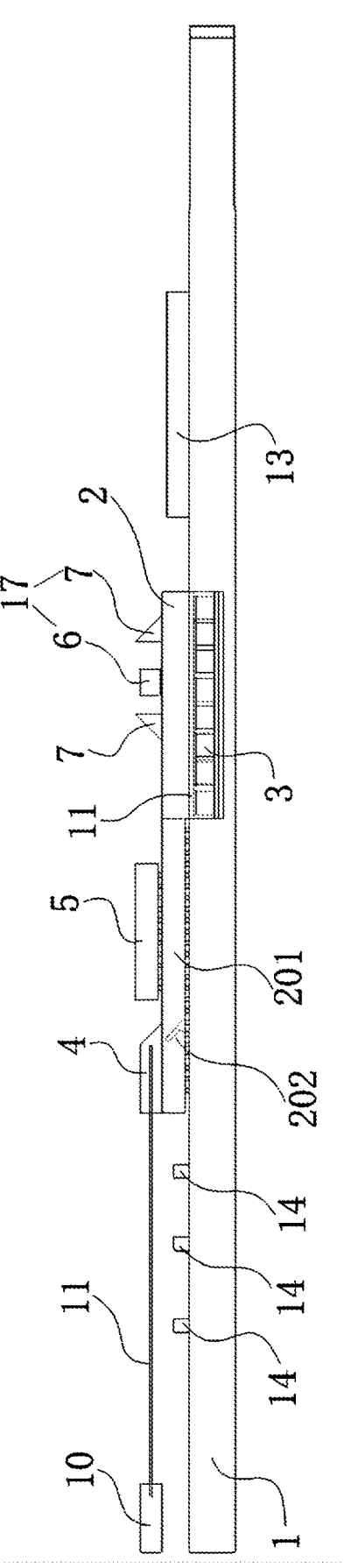
FIG. 2 is a schematic front view of a 400G silicon photonic integrated optical module with an embedded TEC substrate according to an embodiment of the present disclosure.
Figure 3:
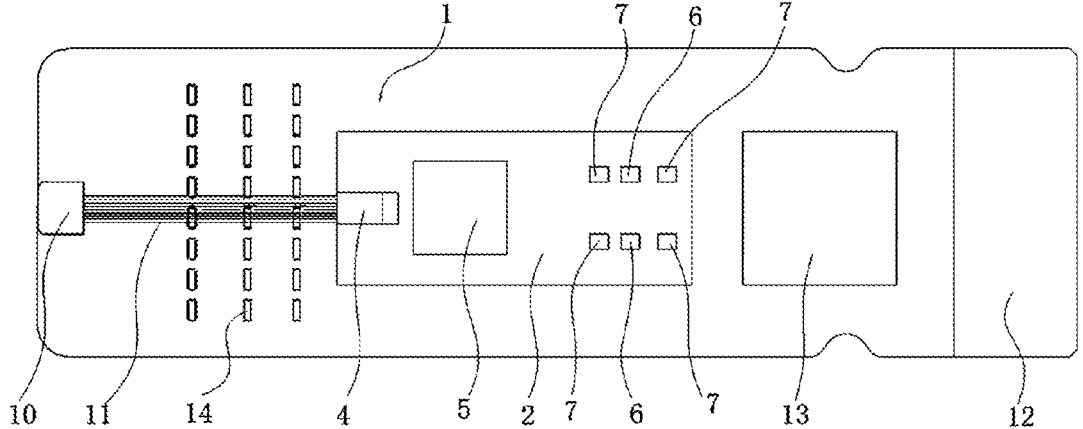
FIG. 3 is a schematic top view of a 400G silicon photonic integrated optical module with an embedded TEC substrate according to an embodiment of the present disclosure.
Figure 4:
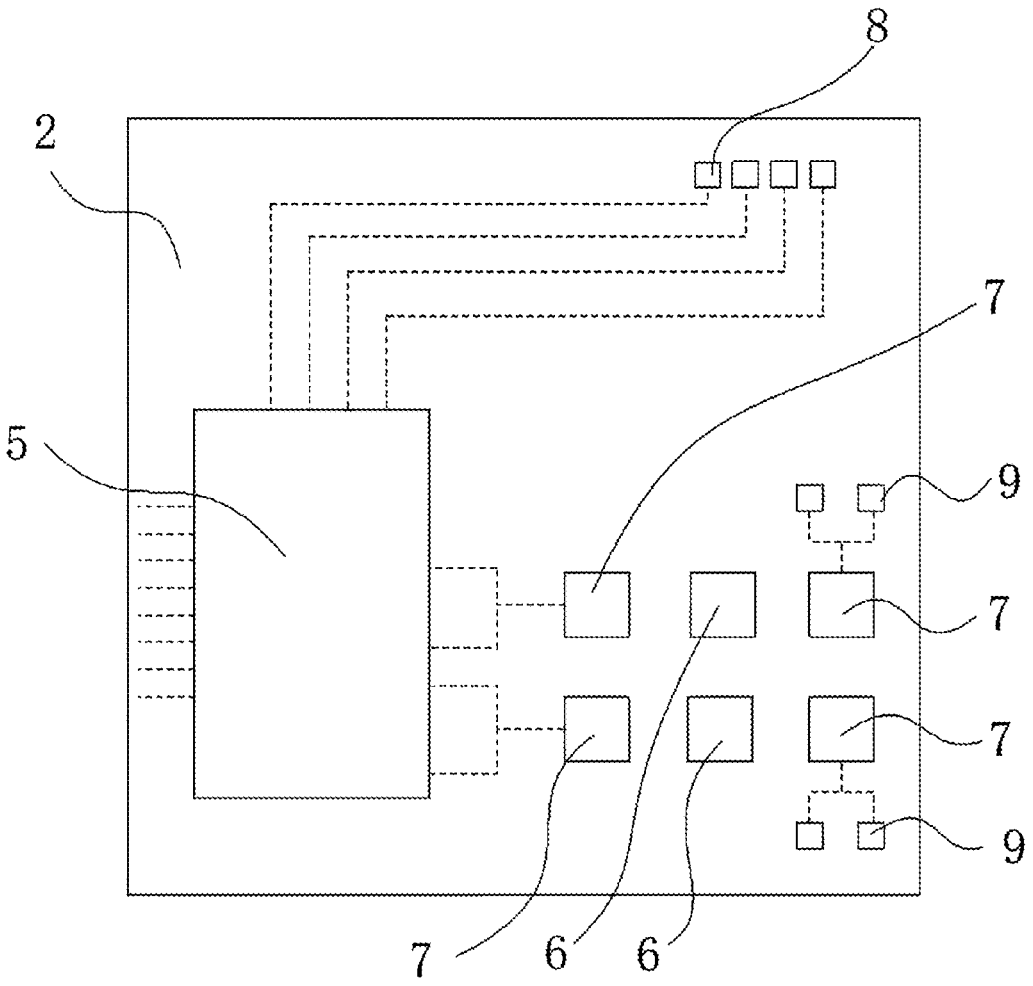
FIG. 4 is a schematic top view of a positional relationship between a silicon photonic integrated circuit board and an electronic integrated circuit board according to an embodiment of the present disclosure.
Figure 5:
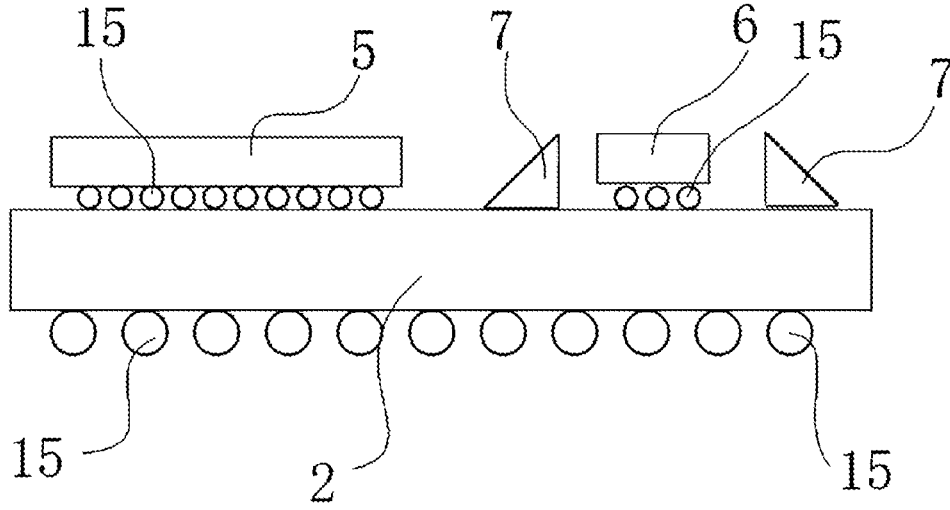
FIG. 5 is a schematic side view of a positional relationship between a silicon photonic integrated circuit board and an electronic integrated circuit board according to an embodiment of the present disclosure.

In the figures: 1: PCB substrate, 11: groove, 2: silicon photonic integrated circuit board, 201: extended segment, 202: filter, 3: TEC substrate, 4: fiber array, 5: electronic integrated circuit board, 6: laser, 7: triangular prism, 8: light-receiving detector, 9: MPD, 10: MPO optical connector, 11: connecting fiber, 12: gold finger electrical connector, 13: digital signal processor, 14: electronic element, 15: solder ball, 16: housing, and 17: light emission assembly.

DETAILED DESCRIPTION

It should be explained that in the description of the present disclosure, terms such as "central", "longitudinal", "transverse" "upper", "lower", "front", "rear", "left", "right" "vertical", "horizontal", "top", "bottom", "inside" and "outside" indicate the orientation or positional relationships based on the drawings. They are merely intended to facilitate and simplify the description of the present disclosure, rather than to indicate or imply that the mentioned device or components must have a specific orientation or must be constructed and operated in a specific orientation. Therefore, these terms should not be construed as a limitation to the present disclosure.

In the description of the present disclosure, it should be noted that, unless otherwise clearly specified, meanings of terms "mount", "connected with", and "connected to" should be understood in a board sense. For example, the connection may be a fixed connection, a removable connection, or an integral connection; may be a mechanical connection or an electrical connection; may be a direct connection or an indirect connection by using an intermediate medium; or may be intercommunication between two elements. Those of ordinary skill in the art may understand specific meanings of the foregoing terms in the present disclosure based on a specific situation.

The specific implementations of the present disclosure are described in more detail below with reference to the accompanying drawings and embodiments. The following examples are intended to illustrate the present disclosure, but not to limit the scope of the present disclosure.

As shown in FIG. 1 to FIG. 7, the 400G silicon photonic integrated optical module with an embedded TEC substrate provided by the embodiment of the present disclosure includes a housing 16, a PCB substrate 1, and a silicon photonic integrated circuit board 2. An accommodating cavity is formed in the housing 16. The PCB substrate 1 is provided in the accommodating cavity. A TEC substrate 3 is embedded into the PCB substrate 1. The silicon photonic integrated circuit board 2 is provided on the TEC substrate 3. The silicon photonic integrated circuit board 2 is provided with an extended segment 201. The extended segment 201 extends along a side of the PCB substrate in a length direction of the PCB substrate 1 to the PCB substrate 1. A fiber array 4, an electronic integrated circuit board 5, a light emission assembly 17, and a light-receiving detector 8 are arranged on the silicon photonic integrated circuit board 2. The fiber array 4 is provided at one side of the electronic integrated circuit board 5. The light emission assembly 17 is provided at the other side of the electronic integrated circuit board 5. The light emission assembly 17 is mounted on the silicon photonic integrated circuit board 2 in an upside-down manner. The light emission assembly 17 and the light-receiving detector 8 are provided above the TEC substrate 3. The light-receiving detector 8 is integrated onto the silicon photonic integrated circuit board 2. The light-receiving detector 8 is connected to the electronic integrated circuit board 5 to receive an optical signal.

According to the present disclosure, the TEC substrate 3 is embedded into the PCB substrate 1. The silicon photonic integrated circuit board 2 is provided on the TEC substrate 3. Components such as the fiber array 4, the electronic integrated circuit board 5, the light emission assembly 17 and the light-receiving detector 8 are arranged on the silicon photonic integrated circuit board 2. Heat from the light emission assembly 17 can be dissipated through the TEC substrate 3 to ensure normal operation of the optical module. Moreover, the light emission assembly 17 is fixed on the silicon photonic integrated circuit board 2 through a flip chip. This omits a welding process of a metal wire and simplifies a manufacturing process.

In the embodiment, the silicon photonic integrated circuit board 2 is mounted on the PCB substrate 1 and the TEC substrate 3 through a flip chip. This omits the pressure welding process of the metal wire. When the flip chip is mounted, a solder ball 15 of the flip chip is mounted on the PCB substrate 1 and the TEC substrate 3.

In the embodiment, the electronic integrated circuit board 5 is mounted on the extended segment 201 of the silicon photonic integrated circuit board 2 through a flip chip. The light emission assembly 17 is mounted on a non-extended segment 201 of the silicon photonic integrated circuit board 2, such that the light emission assembly 17 is provided fittingly above the TEC substrate 3. By mounting the electronic integrated circuit board 5 on the silicon photonic integrated circuit board 2, a space can be saved, and a more space can be reserved on the PCB substrate 1 to provide other components. A solder ball 15 of the flip chip is mounted on an upper surface of the silicon photonic integrated circuit board 2. The term "fittingly above" refers to that the light emission assembly 17 is located at an upper side of a horizontal plane of the TEC substrate 3, and projection of the light emission assembly 17 on the horizontal plane coincides with projection of the TEC substrate 3 on the horizontal plane.

In the embodiment, a groove 11 is formed in the PCB substrate 1. The TEC substrate 3 is embedded into the groove 11. An upper surface of the TEC substrate 3 is flush with an upper surface of the PCB substrate 1. Thus, the silicon photonic integrated circuit board 2 is attached to the TEC substrate 3 to achieve better heat dissipation to the light emission assembly 17, and better control a temperature of a chip of the laser 6 in the light emission assembly 17. Specifically, the groove 11 has an upward rabbet. A shape of the groove 11 matches with a shape of the TEC substrate 3.

In the embodiment, as shown in FIG. 1 to FIG. 5, the light emission assembly 17 includes a laser 6 and triangular prisms 7. Two sides of the laser 6 each are provided with one of the triangular prisms 7. The laser 6 is mounted on the silicon photonic integrated circuit board 2 in an upside-down manner. The triangular prisms 7 are mounted on the silicon photonic integrated circuit board 2. Mirror surfaces of two of the triangular prisms 7 are symmetric with respect to the laser 6. Light from the laser 6 is guided to the silicon photonic integrated circuit board 2 through the triangular prisms 7. The light is modulated and transmitted by the silicon photonic integrated circuit board 2. The laser 6 is mounted on the silicon photonic integrated circuit board 2 through a flip chip, without a connecting metal wire. This omits the pressure welding process of the metal wire, and simplifies the manufacturing process. The TEC substrate 3 is embedded into the PCB substrate 1. The laser 6 is mounted above the TEC substrate 3 in an upside-down manner. This facilitates accurate control on the temperature of the chip of the laser 6 in the light emission assembly 17, thereby controlling a wavelength shift of the laser 6, and improving a stability of the optical module.

Further, there are two light emission assemblies 17. The two light emission assemblies 17 are spaced along a width direction of the silicon photonic integrated circuit board 2. The two light emission assemblies 17 are provided at a same side of the electronic integrated circuit board 5. The two light emission assemblies 17 are structurally the same.

In the embodiment, an MPD 9 is further integrated onto the silicon photonic integrated circuit board 2. The MPD 9 is connected to the light emission assembly 17. The MPD 9 is configured to monitor light from the light emission assembly 17. The electronic integrated circuit board 5 and the MPD 9 are respectively located at two sides of the light emission assembly 17. After modulated, light of the laser 6 transmitted to one triangular prism 7 enters the silicon photonic integrated circuit board 2, and is reflected to the fiber array by a filter 202 on the silicon photonic integrated circuit board 2. After modulated, light of the laser 6 transmitted to the other triangular prism 7 enters the MPD 9 on the silicon photonic integrated circuit board, thereby monitoring emitted light through the MPD 9.

Figure 6:
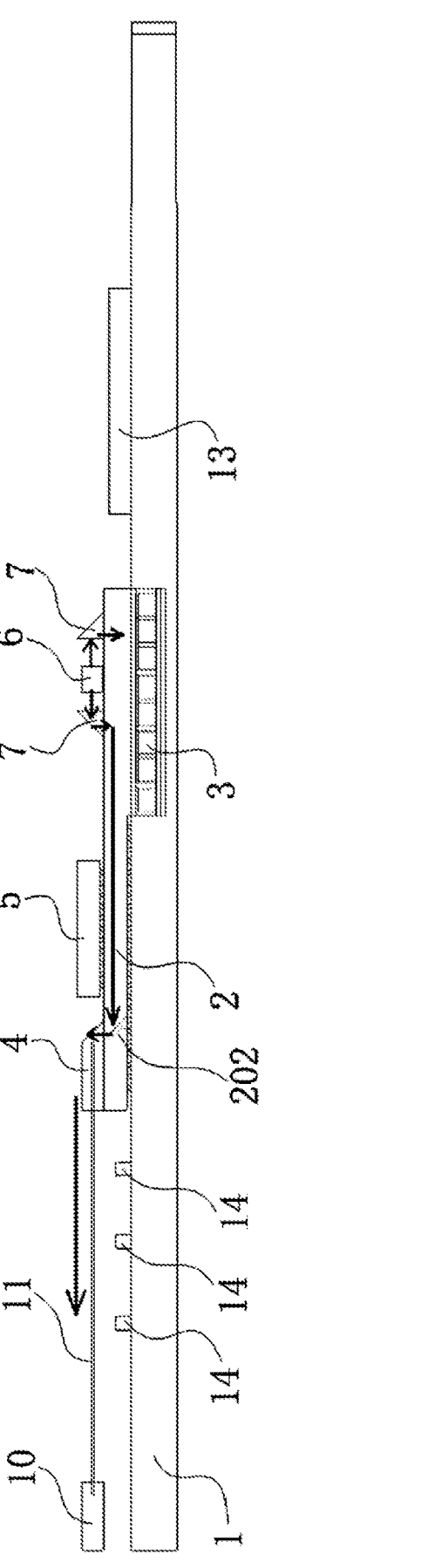
FIG. 6 is a schematic view illustrating an optical transmission of an optical module according to an embodiment of the present disclosure.
Figure 7:
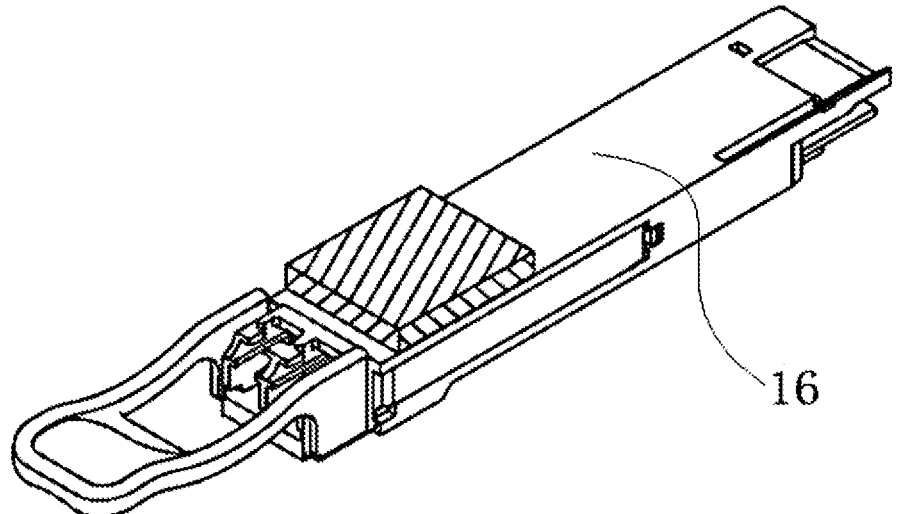
FIG. 7 is a schematic structural view of a housing according to an embodiment of the present disclosure.

In the embodiment, one end of the PCB substrate 1 is provided with an MPO optical connector. The MPO optical connector 10 is connected to the fiber array 4 through a fiber 11, so as to receive light from the light emission assembly 17. The other end of the PCB substrate 1 is provided with a gold finger electrical connector 12. As shown in FIG. 6, the transmission process of the optical path is as follows: Light from the laser 6 is guided to the silicon photonic integrated circuit board 2 through the triangular prism 7. Light modulated by the silicon photonic integrated circuit board 2 is transmitted to the fiber array 4, and then transmitted to the MPO optical connector 10 through the fiber 11.

In the embodiment, a digital signal processor 13 is further provided on the PCB substrate 1. The digital signal processor 13 is provided between the silicon photonic integrated circuit board 2 and the gold finger electrical connector 12.

A Manufacturing Process of the Present Disclosure is as Follows

The TEC substrate 3 is embedded into the PCB substrate 1 in advance. Electronic elements 14 are mounted on the PCB substrate 1. The electronic elements 14 include a capacitor, an inductor, a resistor, etc. The silicon photonic integrated circuit board 2 is mounted on the TEC substrate 3 in an upside-down manner. The electronic integrated circuit board 5 is mounted on the silicon photonic integrated circuit board 2 in an upside-down manner. The laser 6 is mounted on the silicon photonic integrated circuit board 2 in an upside-down manner. The triangular prism 7 is mounted on the silicon photonic integrated circuit board 2. The fiber array 4 is coupled to the silicon photonic integrated circuit board 2. The fiber array 4 is provided at one side of the electronic integrated circuit board 5. The light emission assembly 17 is provided at the other side of the electronic integrated circuit board 5. The housing is assembled. Through circulation of a high temperature and a low temperature, performance test of the optical module is performed.

To conclusion, according to the 400G silicon photonic integrated optical module with an embedded TEC substrate provided by the embodiment of the present disclosure, the TEC substrate 3 is embedded into the PCB substrate 1. The silicon photonic integrated circuit board 2 is provided on the TEC substrate 3. Components such as the fiber array 4, the electronic integrated circuit board 5, the light emission assembly 17 and the light-receiving detector 8 are arranged on the silicon photonic integrated circuit board 2. Heat from the light emission assembly 17 can be dissipated through the TEC substrate 3 to ensure normal operation of the optical module. Moreover, the light emission assembly 17 is fixed on the silicon photonic integrated circuit board 2 through a flip chip. This omits a welding process of a metal wire and simplifies a manufacturing process.

The foregoing are merely descriptions of the preferred embodiments of the present disclosure. It should be noted that several improvements and replacements can be made by a person of ordinary skill in the art without departing from the technical principle of the present disclosure, and these improvements and replacements shall also be deemed as falling within the protection scope of the present disclosure.

The invention claimed is:

1. A 400G silicon photonic integrated optical module with an embedded thermoelectric cooler (TEC) substrate, comprising:

a housing, wherein an accommodating cavity is formed in the housing;

a printed circuit board (PCB) substrate, wherein the PCB substrate is provided in the accommodating cavity, and a TEC substrate is embedded into the PCB substrate; and a silicon photonic integrated circuit board, wherein the silicon photonic integrated circuit board is provided on the TEC substrate, the silicon photonic integrated circuit board is provided with an extended segment, and the extended segment extends along a side of the PCB substrate in a length direction of the PCB substrate to the PCB substrate, wherein a fiber array, an electronic integrated circuit board, a light emission assembly, and a light-receiving detector are arranged on the silicon photonic integrated circuit board; the light emission assembly is mounted on the silicon photonic integrated circuit board in an upside-down manner; and the light emission assembly and the light-receiving detector are provided above the TEC substrate.

2. The 400G silicon photonic integrated optical module with an embedded TEC substrate according to claim 1, wherein the silicon photonic integrated circuit board is mounted on the PCB substrate and the TEC substrate through a flip chip.

3. The 400G silicon photonic integrated optical module with an embedded TEC substrate according to claim 1, wherein the electronic integrated circuit board is mounted on the extended segment of the silicon photonic integrated circuit board through a flip chip.

4. The 400G silicon photonic integrated optical module with an embedded TEC substrate according to claim 1, wherein a groove is formed in the PCB substrate; the TEC substrate is embedded into the groove; and an upper surface of the TEC substrate is flush with an upper surface of the PCB substrate.

5. The 400G silicon photonic integrated optical module with an embedded TEC substrate according to claim 1, wherein the light emission assembly comprises a laser and triangular prisms; two sides of the laser each are provided with one of the triangular prisms; the laser is mounted on the silicon photonic integrated circuit board in an upside-down manner; and mirror surfaces of two of the triangular prisms are symmetric with respect to the laser.

6. The 400G silicon photonic integrated optical module with an embedded TEC substrate according to claim 5, wherein there are two light emission assemblies; the two light emission assemblies are spaced; and the two light emission assemblies are provided at a same side of the electronic integrated circuit board.

7. The 400G silicon photonic integrated optical module with an embedded TEC substrate according to claim 5, wherein a monitor photo detector (MPD) is further integrated onto the silicon photonic integrated circuit board; and the MPD is connected to the light emission assembly.

8. The 400G silicon photonic integrated optical module with an embedded TEC substrate according to claim 1, wherein one end of the PCB substrate is provided with a multi-fiber push on (MPO) optical connector; the MPO optical connector is connected to the fiber array through a fiber; and the other end of the PCB substrate is provided with a gold finger electrical connector.

* * * * *